United States Patent
Wheeler et al.

(10) Patent No.: US 8,285,519 B2
(45) Date of Patent: Oct. 9, 2012

(54) SYSTEM AND METHOD FOR OPERATING A NETWORK OF SENSORS

(75) Inventors: Thomas T Wheeler, Frisco, TX (US);
Qin Ye, Plano, TX (US); Robert W Peterson, Plano, TX (US)

(73) Assignee: Osocad Remote Limited Liability Company, Wilmington, DE (US)

( * ) Notice: Subject to any disclaimer, the term of this patent is extended or adjusted under 35 U.S.C. 154(b) by 316 days.

(21) Appl. No.: 12/629,931

(22) Filed: Dec. 3, 2009

(65) Prior Publication Data

US 2011/0137614 A1    Jun. 9, 2011

(51) Int. Cl.
*G06F 19/00* (2006.01)
(52) U.S. Cl. .......................................... 702/188
(58) Field of Classification Search .................. 702/188, 702/182–185
See application file for complete search history.

(56) References Cited

U.S. PATENT DOCUMENTS

| | | | |
|---|---|---|---|
| 2007/0051872 A1 | 3/2007 | Goldberg | |
| 2008/0071899 A1 | 3/2008 | Odaka | |
| 2010/0310011 A1* | 12/2010 | Sexton et al. | 375/316 |

FOREIGN PATENT DOCUMENTS

| | | |
|---|---|---|
| EP | 1596300 | 11/2005 |
| EP | 1919146 | 5/2008 |
| WO | 2011068628 | 6/2011 |

OTHER PUBLICATIONS

European Patent Office PCT/US2010/055676: International Search Report and Written Opinion; Jun. 28, 2011, 17 Page.
European Patent Office EP Application No. 10193299.4; Extended European Search Report and Search Opinion; Aug. 4, 2011, 20 Pages.
Yin Zhenyu et al.; "Multi-senosr Data Fusion in Wireless Sensor Networks"; Computational Engineering in Systems Applications, IMACS Multiconference on IEEE; Oct. 1, 2006; pp. 1690-1694.
Qi et al. "The Mobile-Agent Framework for Collaborative Processing in Sensor Networks" Jan. 1, 2005, Distributed Sensor Networks, Boca Raton FL; pp. 801-818.
European Patent Office PCT/US2010/055676; Partial Search Report; Mar. 30, 2011, 1 Page.
European Patent Office; IB International Preliminary Report on Patentability and Written Opinion of the ISA, PCT/US2010/055676; Jun. 14, 2012; 11 Pages.

* cited by examiner

*Primary Examiner* — Edward Raymond
(74) *Attorney, Agent, or Firm* — Stolowitz Ford Cowger LLP

(57) ABSTRACT

In a network of sensor nodes, operational efficiency may be increased by configuring the sensor nodes so that sensor agents may be transferred to alternative sensor nodes to process sensor node data, such as when the host sensor node is in a low-power mode. A processing node of the network may be configured to retrieve real-time data from a sensor node, but if real-time data is not available, the processing node may perform calculations on cached data retrieved from a processor node cache or data of a nearby sensor node.

33 Claims, 11 Drawing Sheets

SYSTEM AND METHOD FOR OPERATING A NETWORK OF SENSORS

FIELD OF THE INVENTION

This disclosure relates to systems and methods for measuring and processing data from a plurality of remote sensors.

BACKGROUND OF THE INVENTION

Agent-based processing and reasoning in embedded real-time environments depends on accurate and current data for responsiveness. However, frequent sensor readings or network requests for data may be undesirable due to energy or bandwidth costs, RF interference, stealth requirements, or other reasons. A problem to solve is how to balance agent/application needs for real-time responsiveness against the need to make infrequent sensor readings or network requests to fulfill other system requirements.

LEAP (Low Power Energy Aware Processing) is an example of a typical existing solution to monitor and control energy usage in embedded environments. LEAP enables applications to monitor and control energy usage on an individual node. However, it does not address the issue of agent/node responsiveness in real-time situations. A further problem with LEAP-type solutions is that they become unresponsive in time-critical situations when data is too old or unavailable, and they allow agents to make sensor observations or network requests without regard to energy/bandwidth costs or other issues.

What is required is a system and method for providing enhanced operation of a network of sensors.

SUMMARY OF THE INVENTION

In one aspect of the disclosure, there is provided a system comprising a plurality of sensor nodes each comprising at least one sensor configured to perform a measurement, wherein at least a first sensor node of said plurality of sensor nodes is configured to transmit data indicative of a measurement of a sensor of the first sensor node to at least one second sensor node. The system further comprises at least one processing node configured to receive data from a plurality of sensor nodes including the data indicative of a measurement of a sensor of the first sensor node, and perform a calculation using the received data. The processing node may also be configured to determine if real-time data is available from the first sensor node and if not, retrieve cached data of the first sensor node and perform the calculation using the cached data.

In one aspect of the disclosure, there is provided a method for processing data on a network of sensor nodes. The method comprises establishing a processing mode and a non-processing mode on at least a first sensor node, recording a data measurement from at least one sensor of the first sensor node, determining a processing mode of the first sensor node, if the first sensor node is in a processing mode, processing the at least one data measurement at the first sensor node to generate a result, and if the first sensor node is in a non-processing mode, transferring the processing of the at least one data measurement to a second sensor node and processing the at least one data measurement at the second sensor node to generate the result at the second sensor node.

In one aspect of the disclosure, there is provided a computer-readable medium comprising computer-executable instructions for execution by a processor of a first sensor node, that, when executed, cause the processor to receive at least one data measurement from a sensor, store the at least one data measurement in a memory operatively associated with the processor, generate a data message comprising the at least one data measurement, and communicate the data message to a second sensor node processor of at least one second sensor node remote from the first sensor node.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
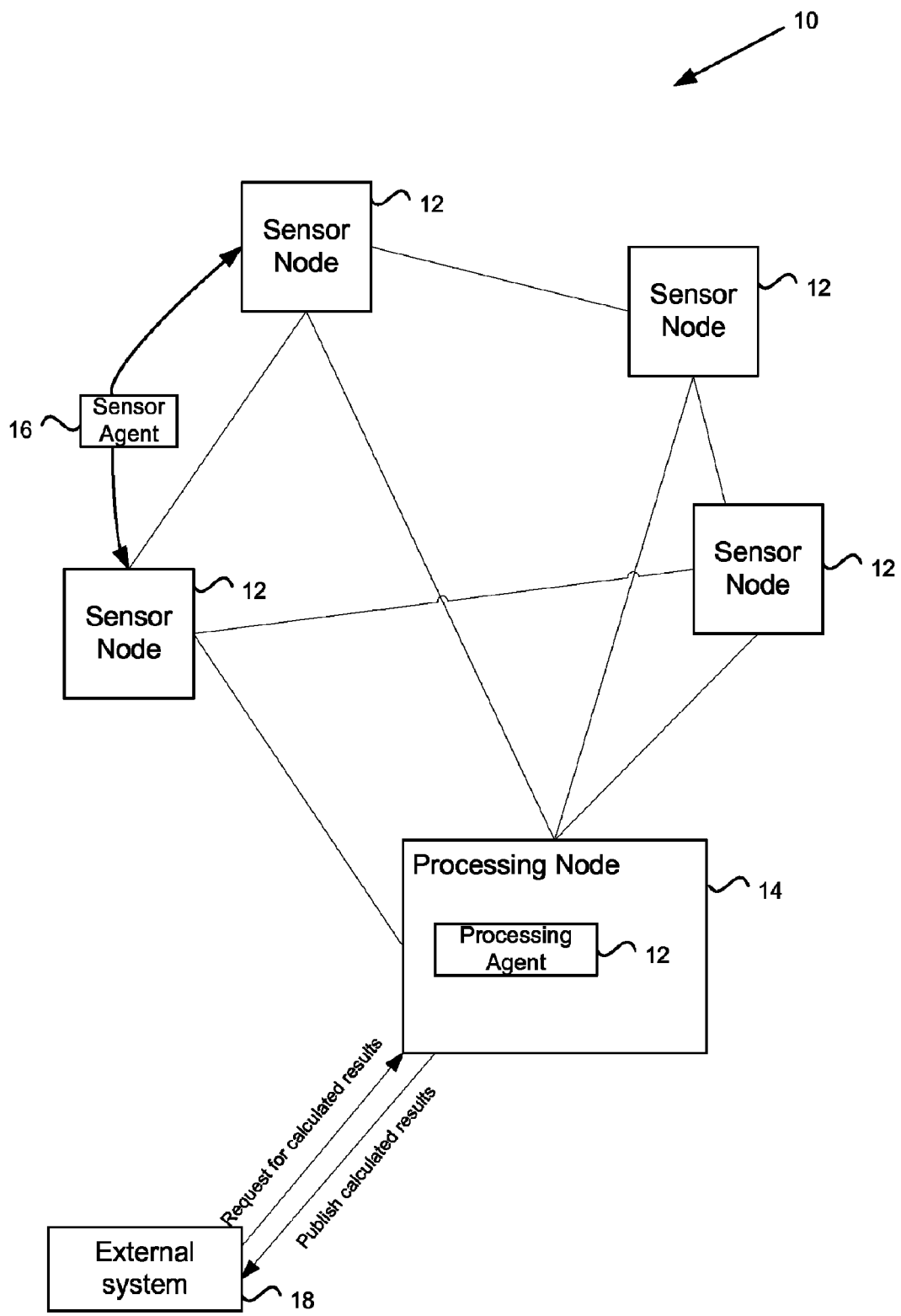
FIG. 1 illustrates a network of sensor nodes, a processing node and an external system.

A system or network 10 in accordance with an embodiment of the disclosure is illustrated in FIG. 1. The system 10 provides a distributed agent-based processing environment composed of networked sensor nodes 12 and at least one processing node 14. Each sensor node 12 obtains data for agents 16 either through direct observation (sensor readings/network requests) or through receiving data from nearby nodes. Agents may be hosted on a sensor node 12 or a processing node 14 as required. In addition and as will be described in greater detail below, agents 16 may be migratable between sensor nodes 12 and between sensor nodes 12 and processing nodes 14. The processing node 14 may communicate with an external system 18 for receiving results requests, in response to which the processing node 14 will publish calculated results.

Figure 2:
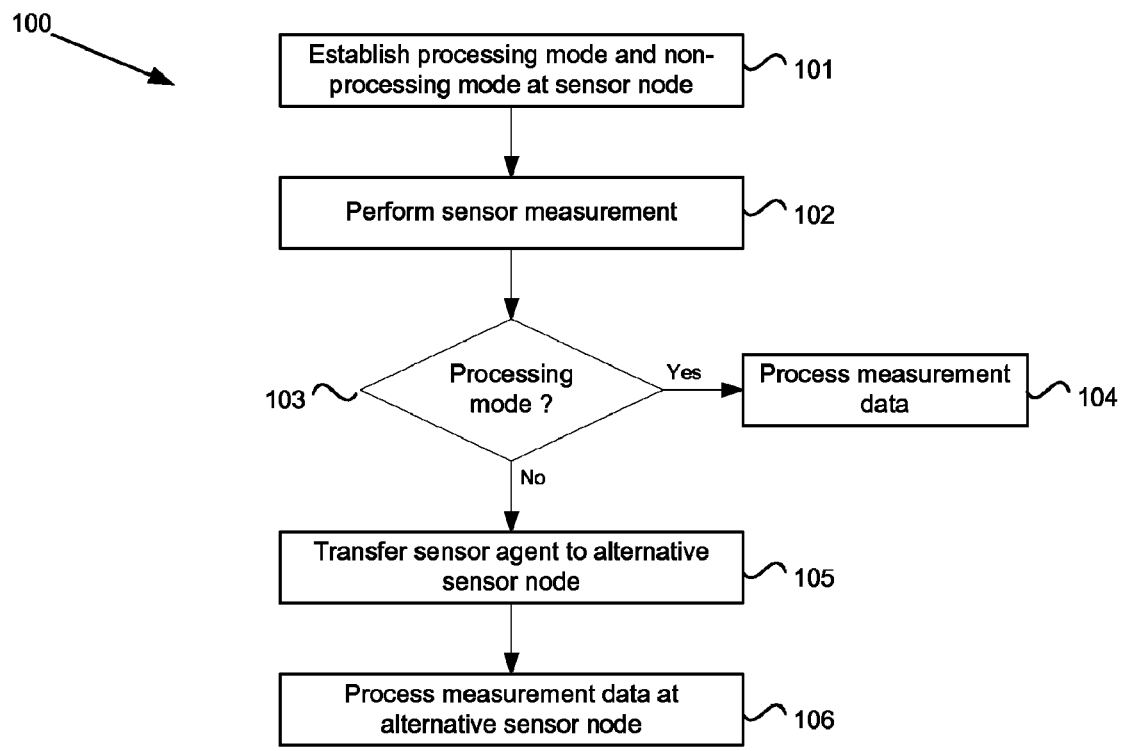
FIG. 2 illustrates a method for processing data on the network of sensor nodes.

In a solution to the problems described above, agents are configured to be able to consider information from nearby sensors/nodes that may already be available. The system is also configured to support distributed processing to reduce energy/network usage, in particular on energy sensitive nodes. A method for processing data on the network 10 is depicted in the flowchart 100 of FIG. 2. At step 101, the sensor nodes may be established with a processing mode and a non-processing mode. A processing mode may be any mode in which a sensor agent of the sensor node is able to process sensor measurement data, such as a full power mode. A non-processing mode may be a low-power, sleep or stealth mode in which the sensor node is not able to process the sensor measurement data. When sensor measurement data is recorded at a first sensor node (step 102), a determination is made as to whether the sensor node is in a processing mode or a non-processing mode (step 103). If the sensor node is in a processing mode, the data may be processed by a sensor agent within the sensor node to generate a result (step 104). If the sensor node is in a non-processing mode, the processing of the measurement data may be transferred to a second sensor node (step 105) so that the result is generated at the second sensor node (step 106).

In various embodiments, the system 10 may be configured as follows:

Data obtained through direct observation at a sensor node 12 may be propagated to nearby nodes;

A sensor agent processing on a sensor node is capable of handling stale data;

A processing agent processing on a processing node is capable of producing results when not all data is available from sensor nodes;

Real-time responsiveness is guaranteed from a processing node even if its data is stale;

A sensor node updates data indirectly via query/update from nearby nodes;

A sensor node updates data directly via local sensor observation or network request;

Determination of when to update data through a direct observation/request is based on energy/efficiency concerns balanced against agent's need for up-to-date accurate data;

A sensor node may replicate an agent's results to nearby nodes;

A sensor agent can move between sensor nodes when necessary to be able to continue processing.

In order to increase the energy and network efficiency, an agent on a sensor node 12 or processing node 14 may be configured to continue to perform calculations even with inaccurate or stale data. The determination of when to make a sensor reading/network request is calculated based on various factors such as sensor density, frequency of observations, changes in sensor readings over time, triggered states or phases of operation, sensor reliability, energy cost to perform an observation, and bandwidth/energy cost to broadcast an observation or data received via a network request. Results of calculations by agents on sensor nodes can be propagated to other sensor nodes and/or a processing node(s), where a processing agent will perform calculations such as data aggregation/fusion, high level reasoning, and final analysis. The processing node controls sensor node behavior based on overall system state and system requirements to best achieve the goals of responsiveness, stealth, battery life, etc.

In one embodiment, an agent 16 on a sensor node 12 can be moved to a different sensor nodes to perform processing, or may be cached at a processing node and re-activated at a later time. For example if Node A is currently operating in a low-power mode and receives sensor/network data that needs to be processed, the agent on Node A may take the data and move to Node B which is already in a high-power mode. Or if Node A is running low on power, the system may transmit sensor readings from Node A to Node B where the agent will operate on the data.

Processing Node Operation

Figure 3:
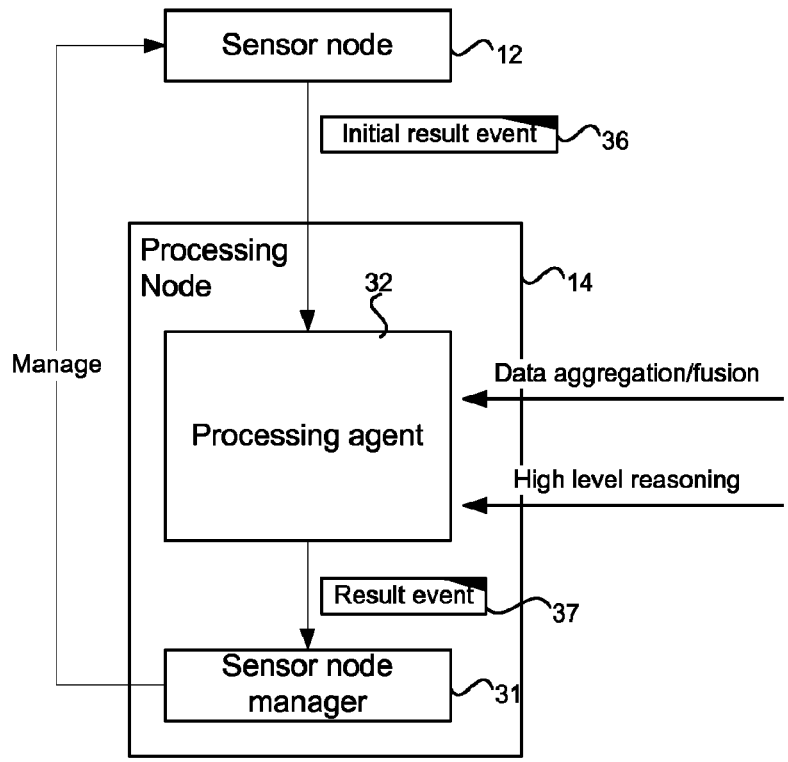
FIG. 3 illustrates a processing node including a processing agent and a sensor node manager.

An embodiment of a processing node 14 is illustrated in FIG. 3. The processing node 14 is responsible for managing a group of Sensor Nodes, of which one Sensor Node 12 is shown in FIG. 3. A Sensor Node Manager 31 in the Processing Node 14 controls Sensor Nodes 12 based on determined system goals of responsiveness, power efficiency, accuracy/reliability of agent results, or other requirements. It sends commands to the Node Operations Controller 63 (described below) on Sensor Nodes 12 to control all behavior, such as enabling/disabling sensors, propagating data and handling agent results (communications rules), and operational state (sleep, sentry, broadcast, high-alert).

The Processing Node 14 also operates a Processing Agent 32. Results from the Sensor Node agents are operated on by the Processing Agent 32. The Processing Agent 32 performs calculations such as data aggregation, data fusion, and high-level reasoning on Sensor Result Events 36 received from Sensor Nodes to produce real-time knowledge that can be acted on in a real-time fashion. The results 37 produced by the Processing Agent 32 are communicated to the Sensor Node Manager 31, which uses the information to dynamically manage the Sensor Nodes.

Figure 4:
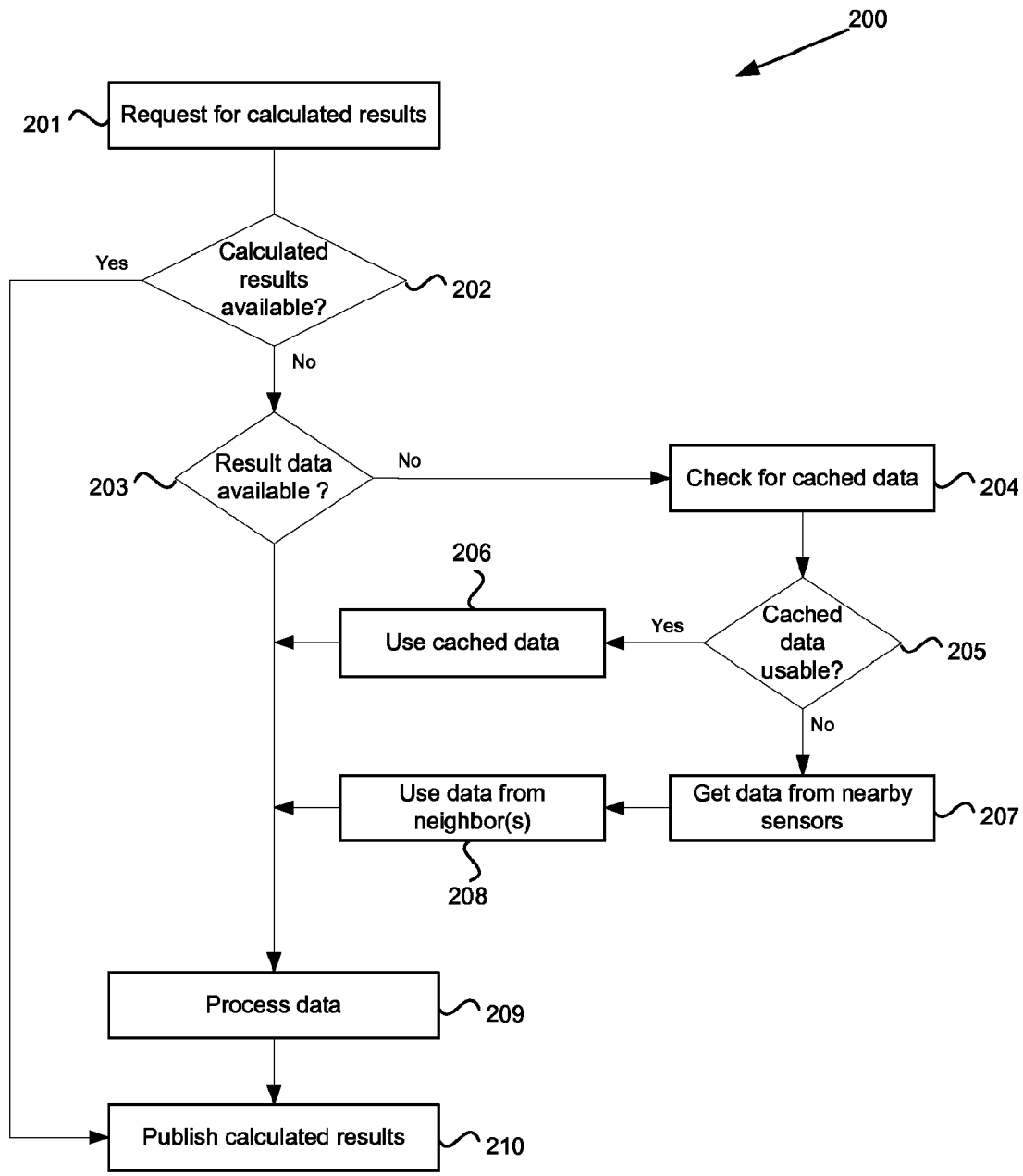
FIG. 4 illustrates a first method of processing data on the processing node.

As described above, the processing node and particularly the processing agent is configured to handle external real-time results requests. An embodiment of the processing agent processing is depicted in the flowchart 200 of FIG. 4. The flowchart 200 relates to querying the processing node 14 for results in a real-time manner. At step 201, the processing agent receives an external real-time request for calculated results. The processing agent checks to see if calculated results are available 202. If calculated results are available, the calculated results are published as the response to the results request (step 210). If no calculated results are available at step 202, the processing agent checks if result data is available 203, for example by polling each relevant sensor node for real-time data. If insufficient data is available, for example if one or more sensor nodes are in a low power mode, stealth mode, are uncontactable, etc, then the processing agent checks for cached data 204 to supplement what real-time data is available. If cached data is found and is useable 205, the available real-time data is supplemented with cached data 206. If no cached data is available, then the processing agent polls the nearby sensor nodes or other processing nodes for either cached data or real-time data 207, which is added to any real-time data at step 208. Thus all data required is available from either current updates from the sensors, caches of the processing node, or real-time data of nearby nodes. Once all the required data are made available, the data is processed 209 and the results published 210, e.g. by transmitting the processing results event as a message in response to the request for calculated results from an external system.

Figure 5:
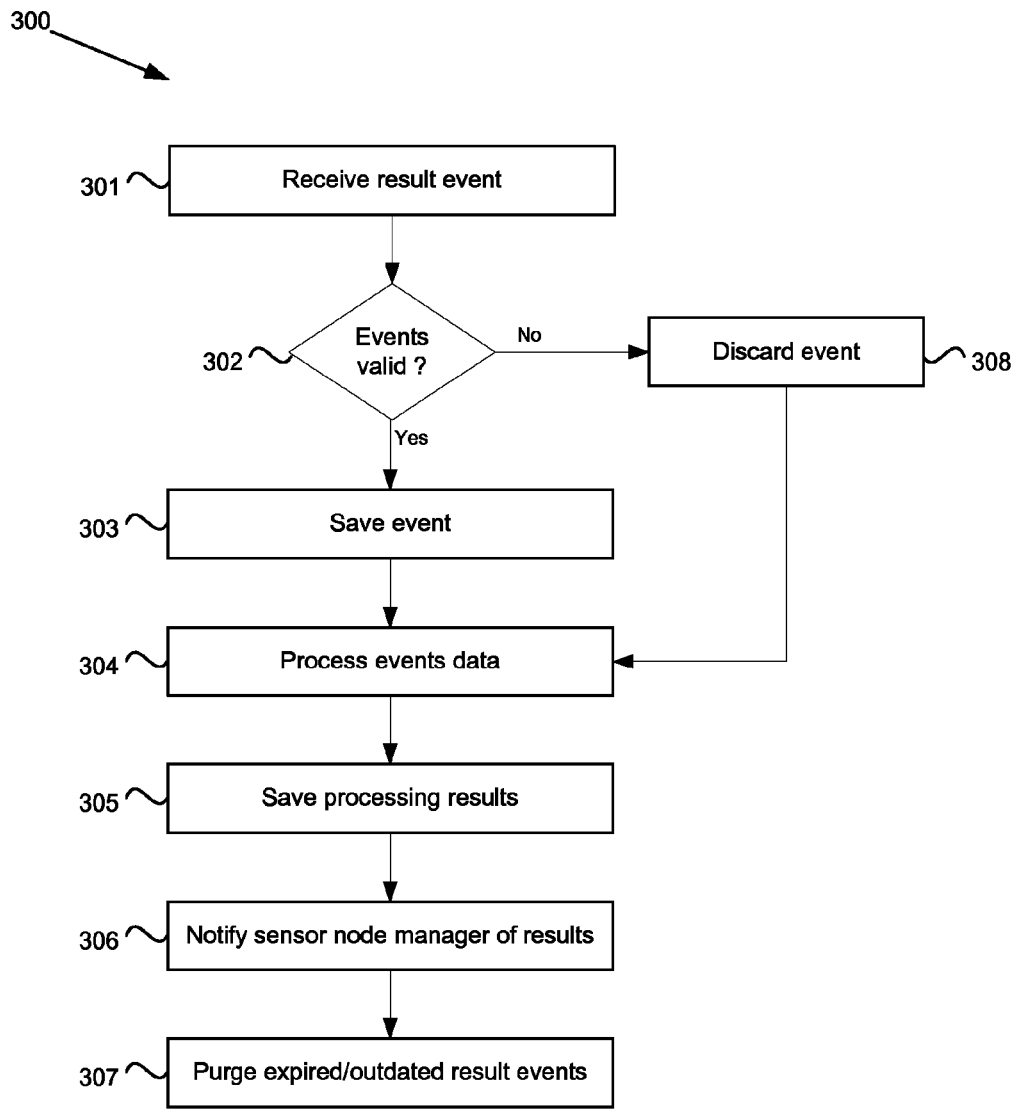
FIG. 5 illustrates a second method of processing data on the processing node.

As the above example illustrates, the processing agent is able to function with stale data when real-time data from the sensor nodes is not available. FIG. 5 provides a flowchart 300 illustrating how the processing agent 32 is configured to cache data from the sensor nodes. At step 301, the processing node receives a result event from a sensor node. The processing agent determines if the result event is valid 302. If the result is not valid, the result event is discarded 308. If the result event is valid, then it is saved 303. The data of the result event is processed 304 and stored 305. The processing results may be delivered to the relevant sensor node manager 306. The processing agent then purges expired or outdated result events 307. The process 300 will typically operate continuously until shut down. Processed results may be sent to a GUI, mass storage etc. The data processing will depend on the particular application and implementation of the system 10 and may include data aggregation, data fusion, complex events processing, etc. The data used in the processing is not limited to data derived from the sensor nodes but may also include data from other sources.

Sensor Node Operation

Figure 6:
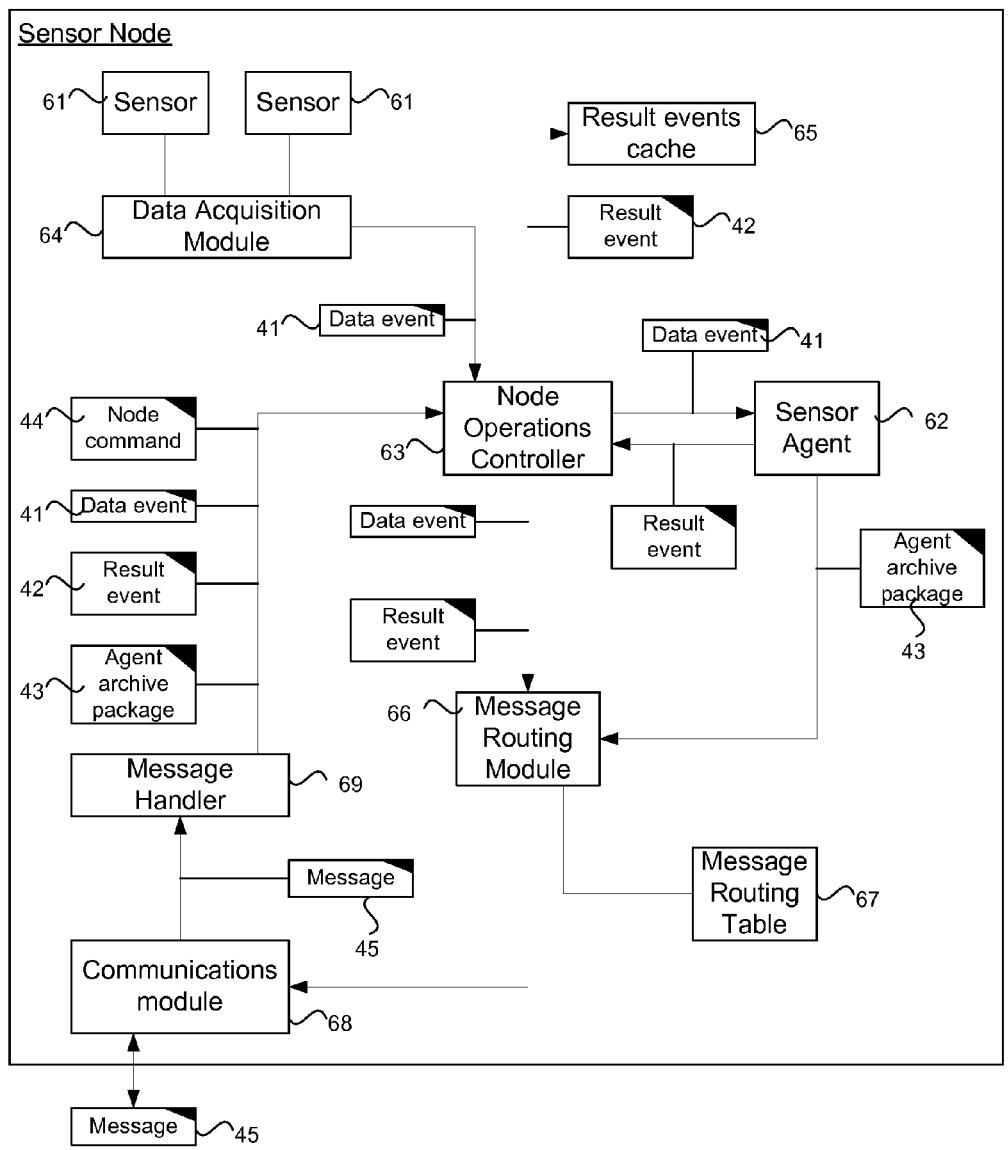
FIG. 6 illustrates a sensor node.

An embodiment of a Sensor Node 12 is illustrated in FIG. 6. Each Sensor Node 12 contains at least one Sensor 61 and supports operation of one or more Sensor Agents 62 programmed to operate on data produced by the node's sensor(s) 61. A Sensor 61 detects or measures a physical stimulus or signal, such as heat, light, acceleration, sound, presence of a chemical, etc., and converts it to measurement data. Each Sensor Node 12 is configured to be able to communicate with at least one other sensor node and/or a processing node. A Node Operations Controller 63 controls the functions of each sensor node. It enables/disables Sensors 61, sends/receives data, and otherwise manages all aspects of the node's operation, including when to operate in a non-processing mode such as low power or sleep mode.

Figure 16:
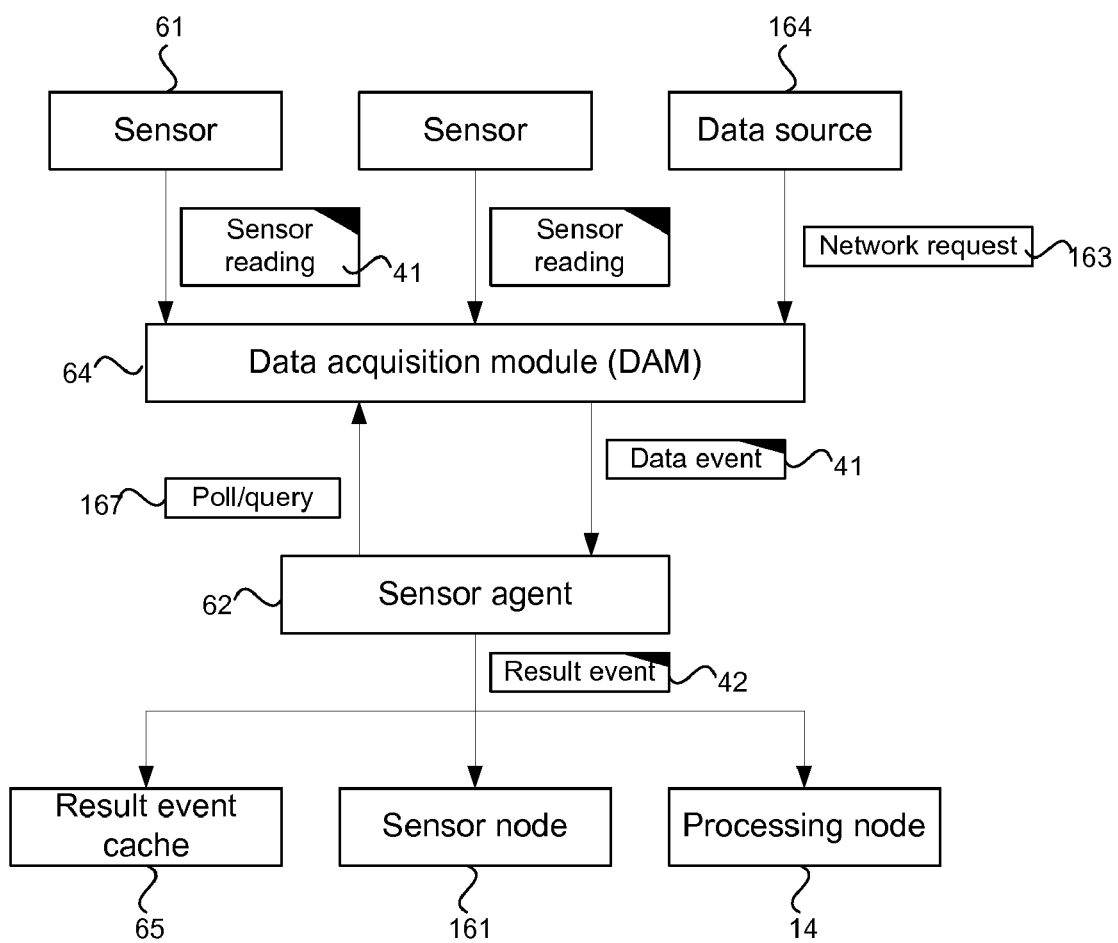
FIG. 16 illustrates a process for processing a Result Event from a Data Event.

FIG. 16 further illustrates the relationship between elements of a sensor node. A Sensor Agent 62 on a Sensor Node 12 receives data 41 from a Data Acquisition Module 64. The Data Acquisition Module 64 receives data from Sensor readings 61, "nearby" nodes, and/or network requests 163 obtained from external data sources 164. The term "nearby" is commonly defined in geolocation terms, but may also be defined in terms of network hops to other nodes, energy cost to communicate with other nodes, etc. The Data Acquisition Module 64 notifies the Sensor Agent 62 when new data is available by sending a Data Event 41 to the agent. The agent may also directly poll or query 167 the Data Acquisition Module 64 for current data. Data Events 41 may also be propagated to nearby nodes or a processing node. When the Sensor Agent 62 receives data from the Data Acquisition Module 64 it processes the data and produces a Result Event 42. The Sensor Agent 62 sends the Result Event 42 to a Result Event Cache 65 on the agent's node. Result Events 42 may also be propagated to nearby sensor nodes 161 or a processing node 14.

As described above, each node has a Node Operations Controller 63 that controls the node's operations including sensors, processing, agent behavior, and communications. The Node Operations Controller 63 may propagate Data Events 41 and Result Events 42 to nearby nodes for caching or processing by resident Sensor agents. It may also move the node's Sensor Agent 62 to another node based on energy conservation needs, phase of operation, or other indications as directed by the Sensor Node Manager 31 of a processing node.

When a Sensor Agent 62 receives notification to move, it stops processing and creates an Agent Archive Package 43 representing a "snapshot" of the agent's current processing state. The Agent Archive Package 43 contains all data necessary for the agent to resume processing on another node. The Node Operations Controller 63 then sends the Agent Archive Package 43 to the destination node. The Agent Archive Package 43 provides a means by which processing may be transferred to another node, for example where a Sensor Agent is unable to operate on the current node. A Sensor Agent may be moved for several reasons such as: the current Sensor Node is being switched to a non-processing (power saving) mode; or the Sensor Agent needs wide area network access to send results and the current Sensor Node does not have wide area network access.

All communication among Sensor Nodes, and between Sensor Nodes and a Processing Node, is performed using a Message Routing Module 66 within each node. A Message Routing Module 66 is used to communicate with agents and nodes. Each agent in the network 10 has a unique identifier. Each node in the network 10 also has a unique identifier. Each agent knows the identity of its "home" node as well as its current node. Each node maintains status of its connectivity to nearby nodes. The Message Routing Module 66 uses this information to build a Message Routing Table 67. It uses the Message Routing Table 67 to determine how to send data to an agent or a node. The Message Routing Module 66 may be used in the following cases, amongst others:

To send/receive a Data Event 41 to/from another node;
To send/receive a Result Event 42 to/from another node;
To send/receive an Agent Archive Package 43 to/from another node;
To receive a Node Command 44;
To forward a message to the next node in the message's itinerary.

The data transferred from one sensor node to another sensor node will typically be data that is derived from or indicative of sensor measurement data from the sensors of a sensor node. The transferred data may be raw measurement data or may have undergone some degree of processing, such as by a sensor agent, and thus may be comprised of result data.

The Message Routing Module 66 uses a Communications Module 68 to send data to the Communications Module 68 of one or more connected nodes. The Communications Module 68 is configured to both send and receive messages. It may use point-to-point or broadcast communication to send data using any suitable communications protocol, of which examples include TCP/IP, UDP, HTTP, SOAP, etc.

When the Message Routing Module 66 sends data (a Data Event 41, Result Event 42 or Agent Archive Package 43) it builds a Message 45 with the following information:

The itinerary for the message consisting of a sequence of node identifiers. The itinerary is calculated using the Message Routing Module 66, which is configured to store routes to nodes one or more hops away;
The message type (Data Event, Result Event, Agent Archive Package, Data Event Request, Result Event Request);
The destination node for the message;
The origin node of the message;
A node-unique identifier for the message;
How many 'hops' away the destination node is, or a predetermined value indicating the number of hops is unknown;
The message contents;
The size in bytes of the complete message.

A person skilled in the art will recognize that other information may be provided in the message.

When the Communications Module 68 of a node receives a message it determines whether the message is destined for the node. If so, it dispatches the message to a Message Handler 69. If not, it dispatches the message to the Message Routing Module 66, which will determine whether or how to forward it.

Figure 7:
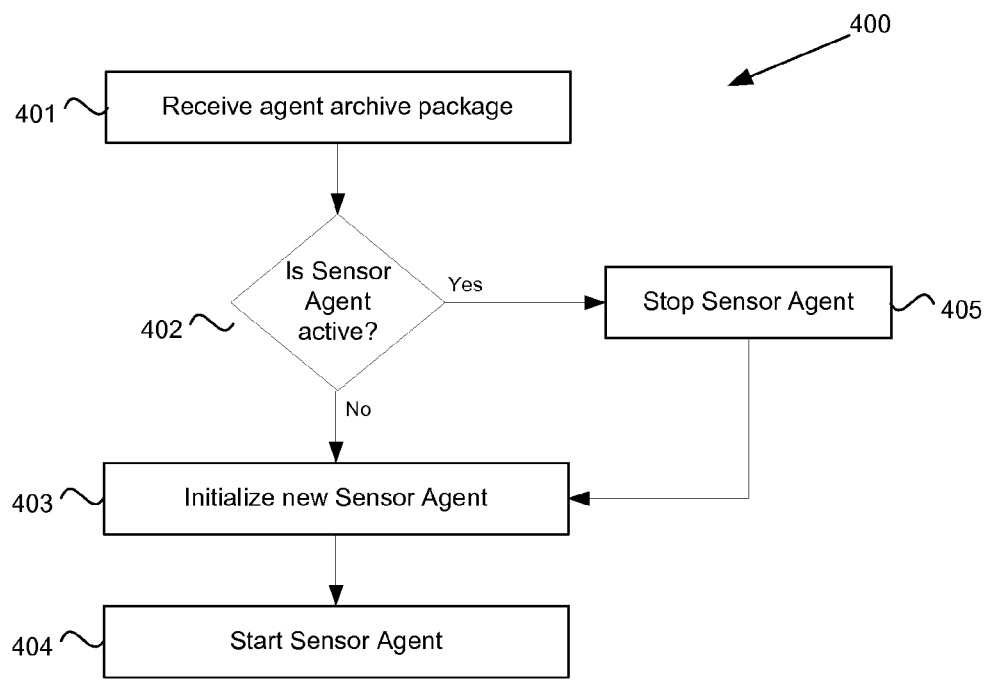
FIG. 7 illustrates a transfer of an agent archive package.

A process for transferring a Sensor Agent is illustrated in the flowchart 400 of FIG. 7. At step 401, a Node Operations Controller 63 of a Sensor Node 12 receives an Agent Archive Package 43 from a nearby sensor node. If the Node Operations Controller 63 determines at step 402 that the Sensor Agent currently resident on the sensor node is active then the resident sensor agent is stopped 405. The new Sensor Agent is then initialized on the Sensor Node (step 403) and started at step 404. Once the new Sensor Agent has been started, it may continue any processing operations of the Agent Archive Package 43. In addition, the Sensor Agent may continue to operate and produce result events either from real-time sensor data from the sensors of its "home" sensor node or from cached data, such as stored in a cache of the sensor node to which the Sensor Agent has been transferred.

Figure 8:
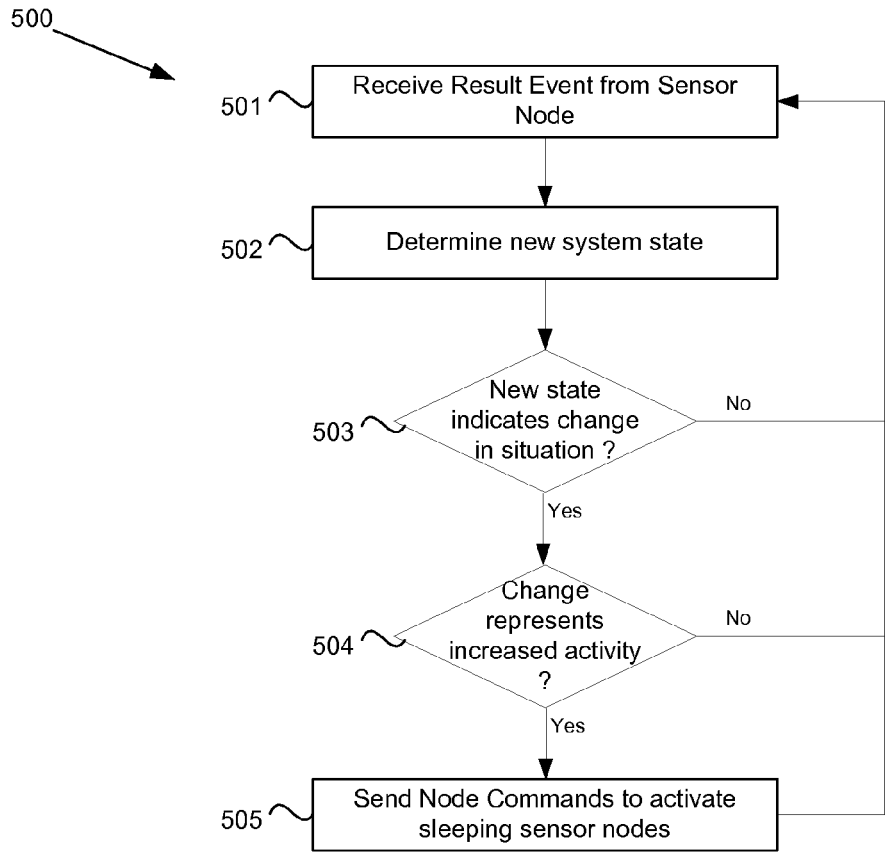
FIG. 8 illustrates an operation of a Node Operations Controller.

A detailed process of the Sensor Node Manager 31 of a Processing Node 14 is depicted in the flowchart 500 of FIG. 8. At step 501, the Sensor Node Manager 31 receives a result event 42 from a sensor node 12. The Sensor Node Manager 31 uses the Result Event to determine a new system state 502. If the new system state does not require a change in situation as determined at 503, then the process returns to step 501 awaiting the next result event 42. Otherwise, if the change in situation represents increased activity as determined at 504, then the Sensor Node Manager 31 sends a node command 44 to activate sleeping sensor nodes. The process then returns to step 501 awaiting the next result event.

Figure 9:
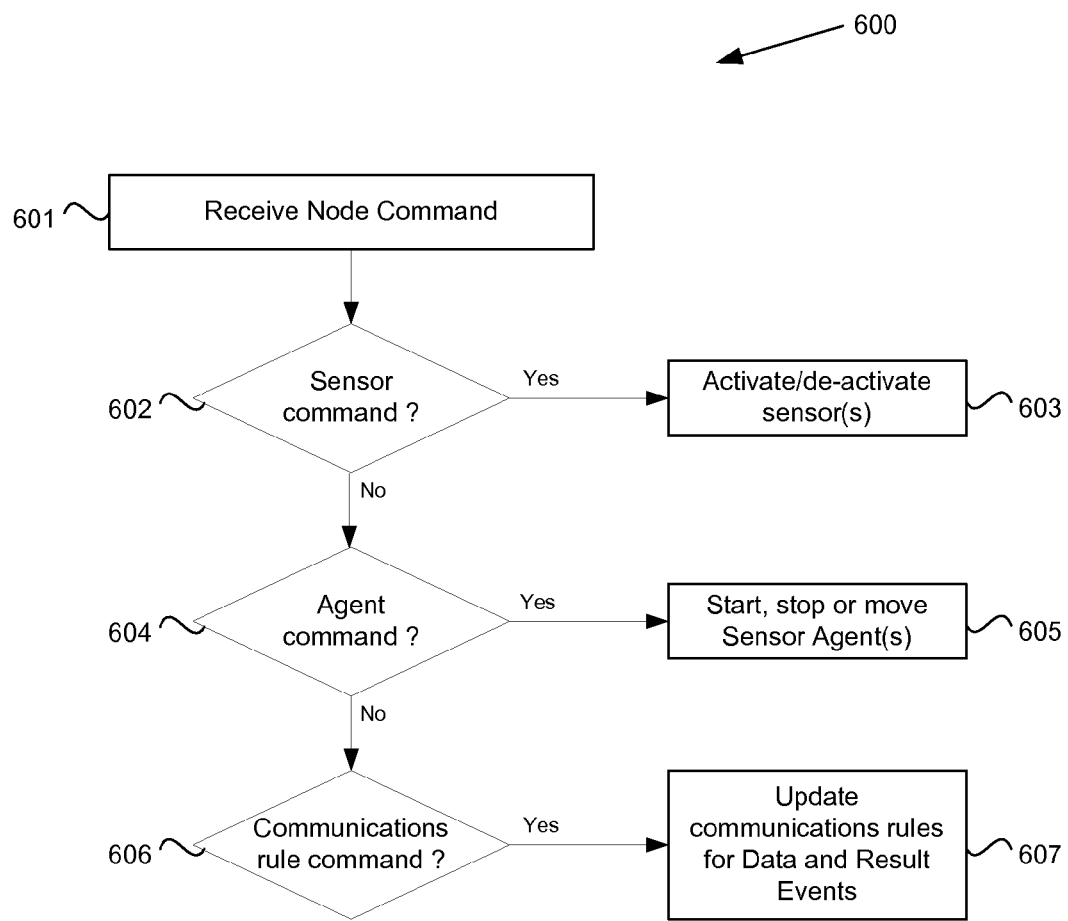
FIG. 9 illustrates a process for processing a Node Command in a Sensor Node.

When the Node Operations Controller 63 receives the Node Command 44 from the Processor Node 14, the Node Command may be processed in accordance with the method of flowchart 600 shown in FIG. 9. At step 601 Node Operations Controller 63 receives the Node Command 44. The Node Operations Controller 63 determines if the Node Command 44 is a sensor command (step 602), and if so, changes the state of sensors 61 accordingly (step 603). The Node Operations Controller 63 determines if the Node Command 44 is a sensor agent command (step 604), and if so, starts, stops, moves or otherwise changes the state of the sensor agent accordingly (step 605). The Node Operations Controller 63 determines if the Node Command 44 is a communications rule command (step 606), and if so, updates communications rules for Data Events and/or Result Events (step 607).

Figure 10:
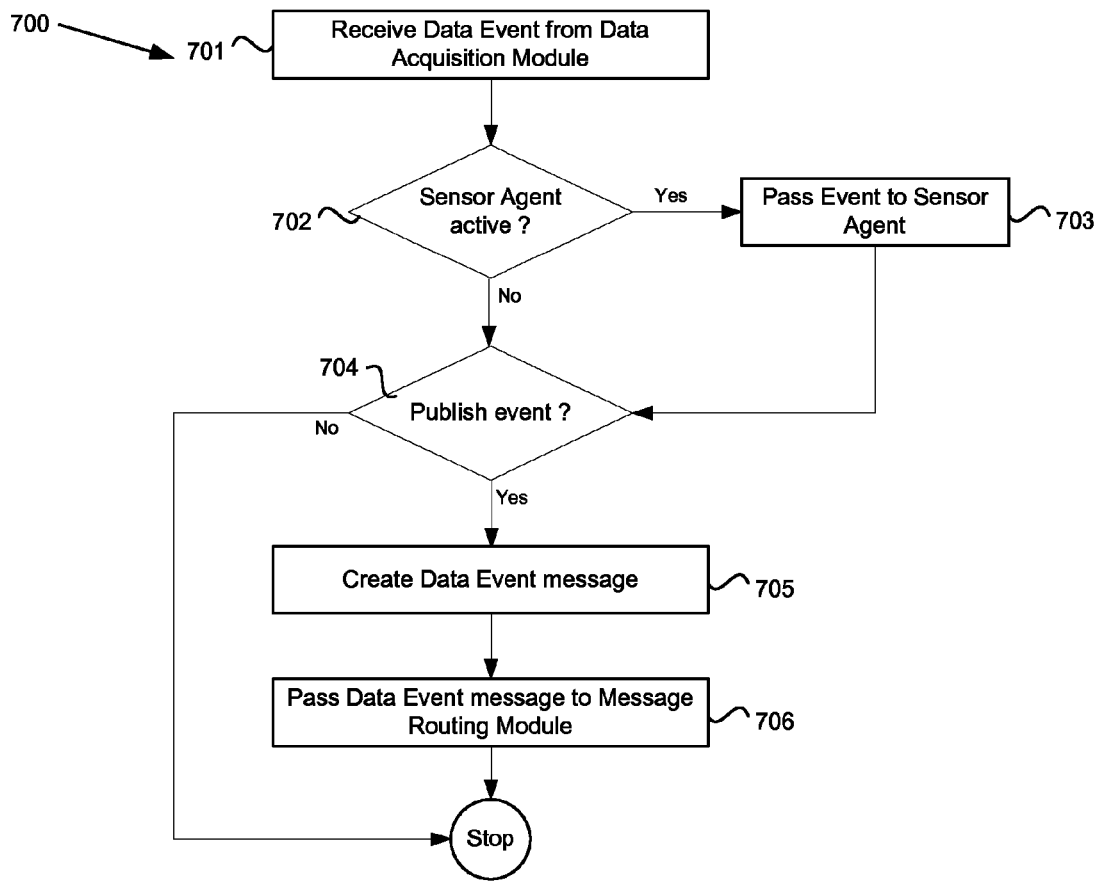
FIG. 10 illustrates a process for processing a Data Event from a Data Acquisition Module within a Sensor Node.

As described above, the Node Operations Controller is configured to process various Events on the Sensor Node 12. A method for processing a Data Event is shown in the flowchart 700 of FIG. 10. At step 701, the Node Operations Controller 63 receives a Data Event 41 from the Data Acquisition Module 64. The Node Operations Controller 63 determines if the Sensor Agent 62 is active (step 702) and if so, passes the Data Events to the Sensor Agent 62 (step 703). If the Data Event is to be published to one or more other nodes (step 704) then a Data Event message is created 705 and passed to the Message Routing Table 67.

Figure 11:
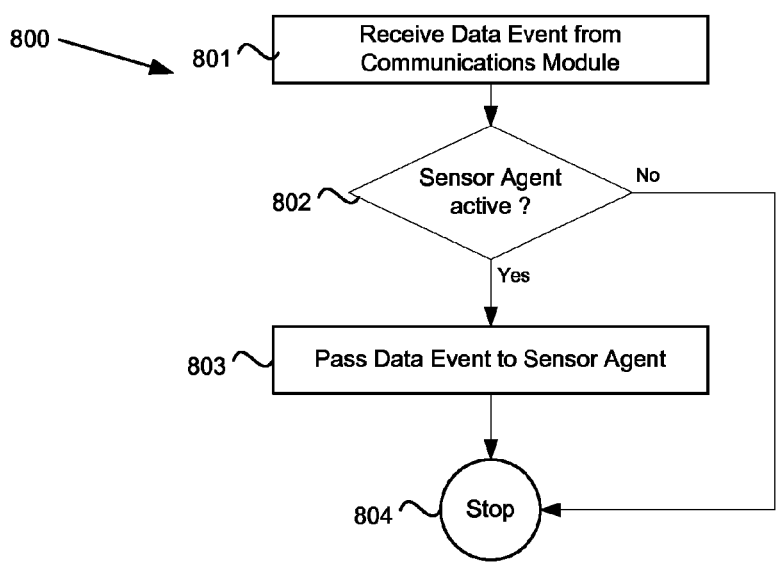
FIG. 11 illustrates a process for processing a Data Event from an external Sensor Node.

FIG. 11 shows an embodiment of a process 800 when a Data Event message, such as the message created in the process 700 is received by the Node Operations Controller 63 from the Communications Module 68. The Data Event message is received from the Communications Module 68 at step 801. If the Sensor Agent 62 of the node is determined to be active at step 802, then the Data Event is passed to the Sensor Agent 62 for processing and then the process stops 804.

Figure 12:
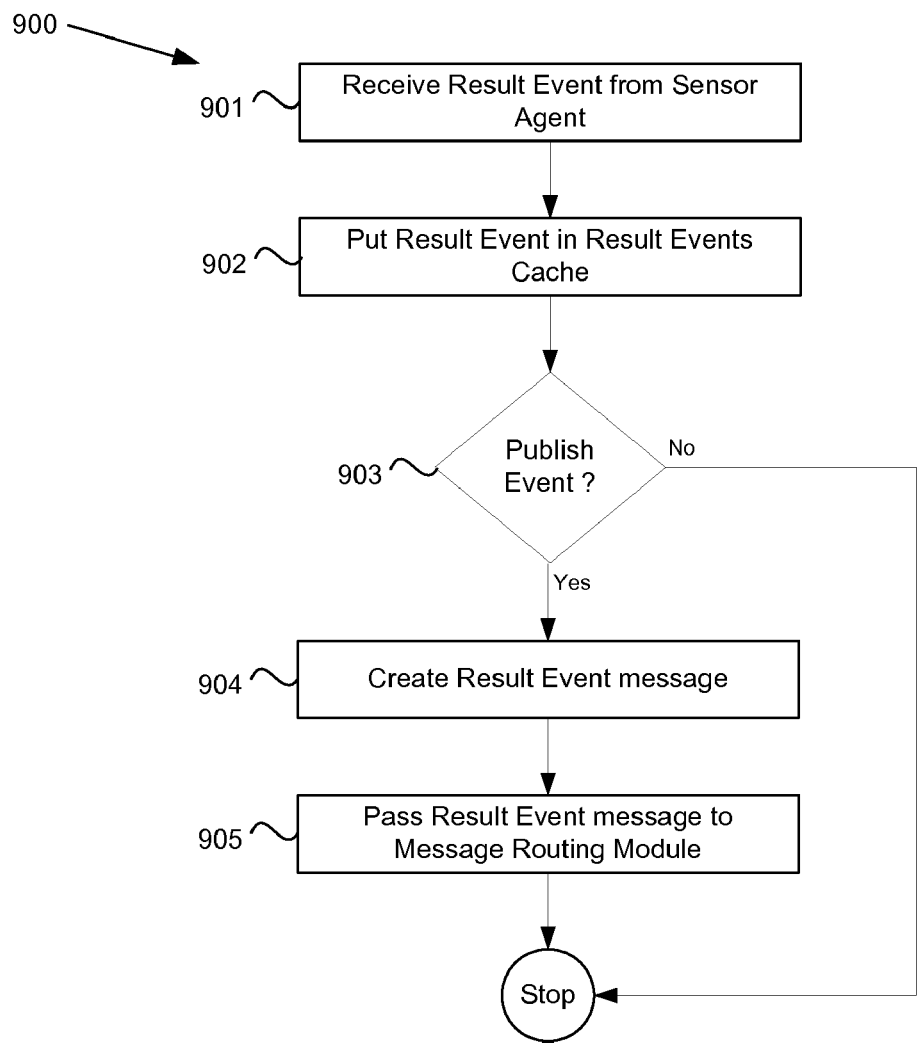
FIG. 12 illustrates a process for processing a Result Event from a Sensor Agent within a Sensor Node.
Figure 13:
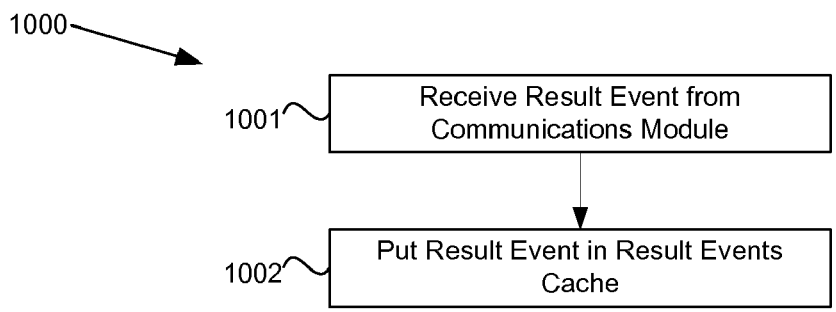
FIG. 13 illustrates a process for processing a Result Event from an external Sensor Node.

The Node Operations Controller may also be configured to receive Result Events from Sensor Agents, an embodiment of which is shown in the process 900 of FIG. 12. At step 901, the Node Operations Controller 63 receives a Result Event 42 generated by the node's Sensor Agent 62. The Result Event 42 is stored in the Result Events Cache 65 at step 902. If step 903 determines that the Result Event is to be published to other nodes so that the Result Event is available while the present node is in a low-power, sleep or stealth mode, then a Result Event message is created 904 and passed to the Message Routing Table 905. If the Node Operations Controller receives a Result Event message from another node via the Communications Module 68, as shown at step 1001 of the process 1000 in FIG. 13, then the Node Operations Controller may proceed to store the Result Event in the Result Events Cache 65 (step 1002).

In many of the processes described above, Data Events 41 and Result Events 42 are published to other nodes to be stored in the Result Events Cache 65 of the respective nodes. That is, the Result Events Cache 65 can store Data Events 41 and Result Events 42 of the resident node as well as Data Events and Result Events passed from nearby nodes. Thus, if a node is unavailable, e.g. due to being in a low-power mode, sleep mode, stealth mode or due to a communication error, data requests to that node may be supplemented by retrieving older i.e. "stale" data from the Result Events Cache of a nearby node.

A system as described above may be deployed in many situations, such as industrial plant monitoring and control, battlefield surveillance, traffic surveillance and control, and other environments where remote sensors may be used. One specific example is a battlefield environment where "smart" mines are deployed. Each mine acts as a "sensor node", with one or more passive sensors equipped to detect the presence of personnel or vehicles. Each mine is configured to operate in a power-saving mode in which its sensors are active on a periodic basis. A processing node is also deployed as part of the minefield. When an active mine's sensors detect the presence of a vehicle or person, the mine broadcasts a message to nearby mines, and through them to the processing node. The processing node receives the messages from the mines and if necessary remotely activates the sensors on currently inactive mines to obtain information necessary to calculate the number, density, heading and speed of vehicles/persons entering the minefield. If one of the sensors is not responsive, the processing node can check the cached data of the sensor to see if it is usable (for example the data is cached recently or it is within the normal range etc). If the cached data is useable, the cached data is used to continue processing. Otherwise the results are calculated based on the nearby sensor data. Based on the information calculated, the processing node signals the mines to detonate.

Embodiments of the system address both the need for agent responsiveness and the need to control when and how often sensor readings or network requests are performed. Particular advantages of the system 10 as described include:
- It allows agents to function with "stale" data to enable them to be real-time responsive;
- It supports moving agents to a different node when necessary to allow them to continue to operate; and
- It duplicates both input data and agent results across nodes to ensure responsiveness and resilience of the system;
- It optimizes efficiency across a network of nodes rather than on only one node.

Figure 14:
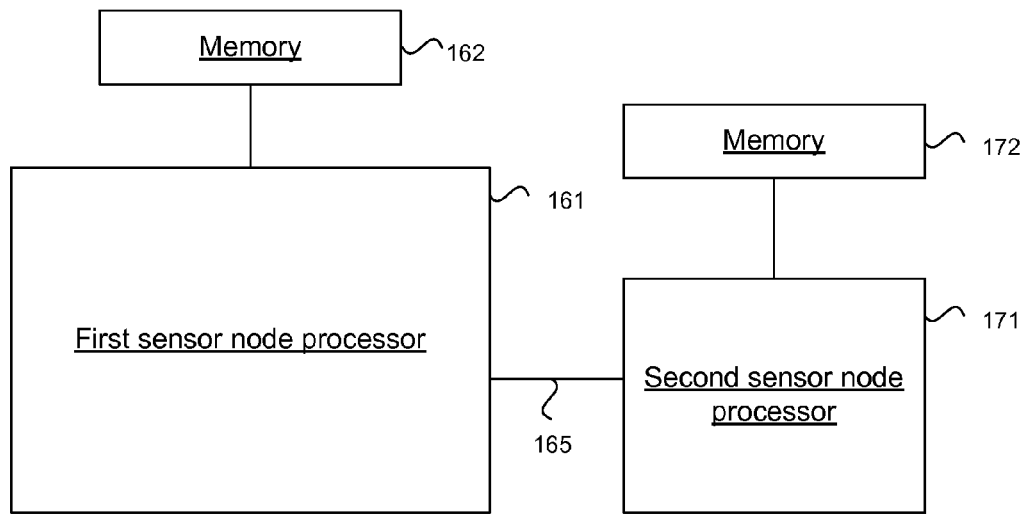
FIG. 14 illustrates a processor and memory of a first sensor node and a second sensor node.

In one embodiment, the sensor nodes may each include a processor such as a first sensor node processor 161 operatively associated with a memory 162 as shown in FIG. 14. The memory 162 may store instructions that are executable on the processor 161. In addition, the memory 162 may provide elements of the sensor node cache. The first sensor node processor 161 may communicate with a processor 171 of a second sensor node, which may also be operatively associated with its own memory 172. The first sensor node processor 161 and the second sensor node processor 171 are typically remote from each other and may communicate through a suitable communications link 165. The term remote is used herein to describe that the remote processor is situated at some sensor node away from the sensor node on which the sensor reading is taken and therefore the transfer of the data message and/or result messages requires a communication across a medium, such as a wireless, infra-red or fixed line medium.

Figure 15:
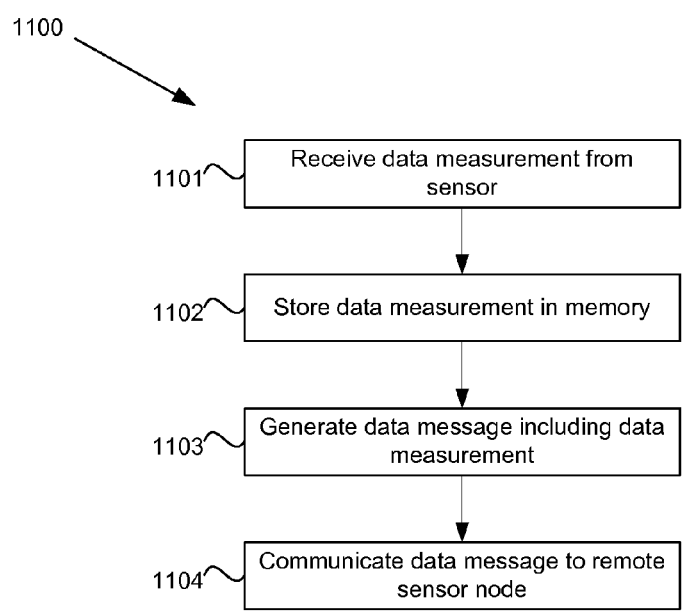
FIG. 15 illustrates an instruction set executable on the processor of the first sensor node of FIG. 14.

An instruction set 1100 that may be executed on the first sensor node processor 161 is depicted in the flowchart of FIG. 15. Specifically, when executed, the instruction set 1100 allows the first sensor node processor to receive at least one data measurement from a sensor (step 1101) and to store the data measurement in the memory 162 (step 1102). The processor 161 may then generate a data message comprising the data measurement (step 1103) and communicate the data message to the second sensor node processor 171. The instruction set 1100 may also include instructions for executing an agent that processes the measurement data and sends a result to the second sensor node processor 171. Alternatively or in addition, the instruction set 1100 may include instructions for transmitting an agent archive package including the agent to the second sensor node processor 171 so that the second sensor node processor 171 may execute the agent. Alternatively or in addition, the instruction set 1100 may include instructions for receiving an agent archive package from the second sensor node processor 171 or an alternative sensor node, and for executing an agent received in the agent archive package on the first sensor node processor 161.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A processing node, comprising:
   a processing agent configured to:
   receive measurement data indicative of a measurement of a first sensor corresponding to a first sensor node;
   perform a calculation using the measurement data in response to determining that real-time data is available from the first sensor node; and
   perform the calculation using cached data retrieved from the first sensor node in response to determining that the real-time data is not available from the first sensor node; and
   a sensor node manager configured to manage the first sensor node in response to the calculation.

2. The processing node according to claim 1, further comprising a cache configured to cache the measurement data from the first sensor node.

3. The processing node according to claim 1, wherein the processing node is further configured to retrieve the measurement data of the first sensor node from a cache of at least one second sensor node.

4. The processing node according to claim 3, wherein the sensor node manager is further configured to identify other sensor nodes available to receive the measurement data corresponding to the first sensor node.

5. The processing node according to claim 1, wherein the sensor node manager is further configured to:
   determine an operative state of at least one sensor node; and
   instruct the at least one sensor node to transfer a corresponding sensor agent and a corresponding data to an alternative sensor node.

6. The processing node according to claim 5, wherein the sensor node manager is further configured to instruct the at least one sensor node to transfer the corresponding sensor agent and the corresponding data in response to an operative state of the at least one sensor node being in a low-power mode, sleep mode, or stealth mode.

7. A method, comprising:
   recording a data measurement from at least one first sensor corresponding to a first sensor node;
   processing the data measurement at the first sensor node to generate a result in response to the first sensor node being in a processing mode; and
   transferring the data measurement to a second sensor node to generate the result at the second sensor node in response to the first sensor node being in a non-processing mode.

8. The method according to claim 7, wherein processing the data measurement at the first sensor node further comprises directing a first sensor agent to process the data measurement.

9. The method according to claim 8, wherein transferring the data measurement to the second sensor node further comprises directing transferring the first sensor agent to the second sensor node.

10. The method according to claim 9, further comprising:
    determining if a second sensor agent is active on the second sensor node; and
    deactivating the second sensor agent in response to the determination.

11. The method according to claim 7, wherein transferring the processing of the data measurement to the second node occurs in response to a command.

12. A computer-readable storage device comprising computer-executable instructions stored thereon that configure a first processing node to perform operations comprising:
    receiving a data measurement from a first sensor corresponding to a first sensor node;
    storing the data measurement in a memory operatively associated with the first processing node;
    generating a data message comprising the data measurement; and
    communicating the data message to a second sensor node remote from the first sensor node.

13. The computer-readable storage device according to claim 12, wherein the first processing node is configured to perform operations further comprising:
    executing a first agent to process the data measurement to produce a result;
    generating a result message corresponding to the result; and
    transmitting the result message to the second sensor node.

14. The computer-readable storage device according to claim 13, wherein the first processing node is configured to perform operations further comprising:

instructing a first sensor node to generate a first agent archive package comprising the first agent and the data measurement; and instructing the first sensor node to transmit the first agent archive package to the second sensor node.

15. The computer-readable storage device according to claim 12, wherein the first processing node is configured to perform operations further comprising:

instructing the first sensor node to receive an agent archive package from a second sensor node, the agent archive package comprising a second agent executable by the first sensor node and a second data measurement from a second sensor corresponding to the second sensor node; and instructing the first sensor node to execute the second agent to process the second data measurement.

16. A sensor node, comprising:

a sensor configured to generate sensor data in response to measuring an event;

a sensor agent configured to store the sensor data in a cache; and a control module configured to direct the sensor agent to create an archive package comprising the sensor data stored in the cache.

17. The sensor node of claim 16, further comprising an acquisition module configured to notify the sensor agent of new sensor data.

18. The sensor node of claim 17, wherein the control module is further configured to transmit the archive package and the sensor agent to a destination sensor node.

19. The sensor node of claim 17, further comprising a message routing module configured to communicate with the sensor agent, a sensor node associated with the sensor agent, or at least another sensor node associated with at least another sensor agent.

20. The sensor node of claim 16, wherein the control module is further configured to:

inactivate the sensor agent in response to determining that the sensor agent is active and in response to receiving a new agent archive package from a nearby sensor node; and initialize a new agent sensor agent included in the new agent archive page.

21. The sensor node of claim 20, wherein the new sensor agent is configured to operate in response to real-time sensor data from a corresponding home sensor node or from the sensor data stored in the cache.

22. A method, comprising:

generating sensor data in response to measuring an event using a sensor;

storing the sensor data in a cache; and directing a sensor agent to create an archive package comprising the sensor data stored in the cache.

23. The method of claim 22, further comprising notifying the sensor agent of new sensor data.

24. The method of claim 22, further comprising transmitting the archive package and the sensor agent from a sensor node to a destination sensor node.

25. The method of claim 24, further comprising using a routing communication module in the sensor node to communicate with the sensor agent, at least another sensor node associated with at least another sensor agent, or the at least another sensor node.

26. The method of claim 22, further comprising:

deactivating the sensor agent in response to determining that the sensor agent is active and in response to receiving a new agent archive package from a nearby sensor node; and initializing a new sensor agent included in the new agent archive page.

27. The method of claim 26, further comprising operating the new sensor agent in response to real-time sensor data from a corresponding home sensor node or from the sensor data stored in the cache.

28. A computer-readable storage device comprising computer-executable instructions stored thereon that configure a first sensor node to perform operations comprising:

generating sensor data in response to measuring an event using a sensor;

storing the sensor data in a cache; and directing a sensor agent to create an archive package comprising the sensor data stored in the cache.

29. The computer-readable storage device according to claim 28, wherein the first sensor node is configured to perform operations further comprising:

notifying the sensor agent of new sensor data.

30. The computer-readable storage device according to claim 28, wherein the first sensor node is configured to perform operations further comprising:

transmitting the archive package and the sensor agent from a sensor node to a destination sensor node.

31. The computer-readable storage device according to claim 30, wherein the first sensor node is configured to perform operations further comprising:

using a routing communication module in the sensor node to communicate with the sensor agent, at least another sensor node associated with at least another sensor agent, or the at least another sensor node.

32. The computer-readable storage device according to claim 28, wherein the first sensor node is configured to perform operations further comprising:

deactivating the sensor agent in response to determining that the sensor agent is active and in response to receiving a new agent archive package from a nearby sensor node; and initializing a new sensor agent included in the new agent archive page.

33. The computer-readable storage device according to claim 32, wherein the first sensor node is configured to perform operations further comprising:

operating the new sensor agent in response to real-time sensor data from a corresponding home sensor node or from the sensor data stored in the cache.

* * * * *

UNITED STATES PATENT AND TRADEMARK OFFICE
CERTIFICATE OF CORRECTION

PATENT NO. : 8,285,519 B2  
APPLICATION NO. : 12/629931  
DATED : October 9, 2012  
INVENTOR(S) : Wheeler et al.

Page 1 of 1

It is certified that error appears in the above-identified patent and that said Letters Patent is hereby corrected as shown below:

Title Page, Item (75), under "Inventors", in Column 1, Line 1, delete "T" and insert -- T. --, therefor.

Title Page, Item (75), under "Inventors", in Column 1, Line 2, delete "W" and insert -- W. --, therefor.

Title Page, Item (56), under "OTHER PUBLICATIONS", in Column 2, Line 5, delete "al.; "Multi-senosr" and insert -- al. "Multi-sensor --, therefor.

Signed and Sealed this  
Ninth Day of April, 2013

Teresa Stanek Rea  
*Acting Director of the United States Patent and Trademark Office*